(12) United States Patent
Richards

(10) Patent No.: US 8,763,627 B2
(45) Date of Patent: Jul. 1, 2014

(54) FASTENER

(75) Inventor: Shelton O. Richards, Rocky Hill, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/487,623

(22) Filed: Jun. 4, 2012

(65) Prior Publication Data

US 2012/0234402 A1  Sep. 20, 2012

Related U.S. Application Data

(62) Division of application No. 12/719,301, filed on Mar. 8, 2010, now Pat. No. 8,191,224, which is a division of application No. 11/416,655, filed on May 2, 2006, now abandoned.

(51) Int. Cl.
   *F16B 33/00* (2006.01)
   *F16L 3/00* (2006.01)

(52) U.S. Cl.
   USPC .......................................... 137/343; 411/375

(58) Field of Classification Search
   USPC .......... 29/509, 552.02, 469.5; 403/11, 23, 28, 403/30, 381, 408.1; 411/372.5–377, 366.1; 137/343
   See application file for complete search history.

(56) References Cited

U.S. PATENT DOCUMENTS

| 848,003 | A | 3/1907 | Braunschweig |
|---|---|---|---|
| 1,296,165 | A | 3/1919 | Costuma |
| 2,327,050 | A | 8/1943 | Kotler |
| 2,653,835 | A | 9/1953 | Nelson |
| 3,255,559 | A | 6/1966 | Gaeth et al. |
| 3,449,988 | A | 6/1969 | Gallo, Sr. |
| 4,394,096 | A | 7/1983 | Stevens |
| 4,479,163 | A | 10/1984 | Bannink, Jr. et al. |
| 4,512,699 | A | 4/1985 | Jackson et al. |
| 4,544,312 | A | 10/1985 | Stencel |
| 4,630,168 | A | 12/1986 | Hunt |
| 4,681,497 | A | 7/1987 | Berecz |
| 4,749,029 | A | 6/1988 | Becker et al. |
| 4,753,560 | A | 6/1988 | Ryder |
| 4,884,929 | A | 12/1989 | Smith et al. |
| 4,975,006 | A | 12/1990 | Swanson |

(Continued)

FOREIGN PATENT DOCUMENTS

| EP | 0224817 | 7/1989 |
|---|---|---|
| GB | 684821 | 12/1952 |
| GB | 837234 | 6/1960 |
| GB | 916161 | 1/1963 |
| GB | 948934 | 2/1964 |
| GB | 2189563 | 10/1987 |
| KR | 200379669 | 3/2005 |
| WO | 03/045684 | 6/2003 |

OTHER PUBLICATIONS

European Office Action for European Patent Application No. 07250879.9, dated Apr. 5, 2012.

(Continued)

*Primary Examiner* — John C Hong
(74) *Attorney, Agent, or Firm* — Bachman & LaPointe, P.C.

(57) ABSTRACT

A fastener has a metallic member and a nonmetallic cap member. The metallic member has a head and a shaft. The shaft has a first end at the head, a distal second end, and an externally threaded portion. The metallic member further has a projection extending from the head opposite the shaft. The cap member is mated to the head opposite the shaft and retained by the projection.

19 Claims, 7 Drawing Sheets

(56) References Cited

U.S. PATENT DOCUMENTS

| | | |
|---|---|---|
| 4,979,281 A | 12/1990 | Smith et al. |
| 5,391,028 A | 2/1995 | Charles |
| 5,557,897 A | 9/1996 | Kranz et al. |
| 5,603,472 A | 2/1997 | Hutter, III |
| 5,707,041 A | 1/1998 | Bovee et al. |
| 5,845,872 A | 12/1998 | Pridham et al. |
| 6,302,630 B1 | 10/2001 | Grant |
| 6,315,485 B1 | 11/2001 | Speck et al. |
| 6,527,489 B2 | 3/2003 | Kando |
| 2003/0123953 A1* | 7/2003 | Razzell .................. 411/419 |
| 2005/0260033 A1 | 11/2005 | Arbona et al. |
| 2005/0260034 A1 | 11/2005 | Arbona |
| 2007/0280822 A1 | 12/2007 | Frost et al. |

OTHER PUBLICATIONS

Korean Office Action for Korean Patent Application No. 10-2006-134456, dated Dec. 7, 2007.
European Search Report for EP Patent Application No. 07250879.9, dated Mar. 21, 2011.
Von H. Eder, "Feinwerktechnische Verbindungen Durch Plastisches Verformen", Jan. 1, 1961, pp. 135-152.

* cited by examiner

FASTENER

CROSS REFERENCE TO RELATED APPLICATIONS

This is a divisional application of Ser. No. 12/719,301, filed Mar. 8, 2010, and entitled "Fastener" (now U.S. Pat. No. 8,191,224) which is a divisional application of Ser. No. 11/416,655, filed May 2, 2006, and entitled "Fastener" (now abandoned).

U.S. GOVERNMENT RIGHTS

The invention was made with U.S. Government support under contract N00019-02-C-3003 awarded by the U.S. Navy. The U.S. Government has certain rights in the invention.

BACKGROUND OF THE INVENTION

The invention relates to aircraft. More particularly, the invention relates to fasteners exposed to the exhaust gas flowpath of an aircraft powerplant.

A variety of non-metallic materials have been developed for use in aircraft propulsion. One family of materials are ceramic matrix composites (CMCs). In various implementations, CMCs offer advantageous combinations of: (a) resistance to high temperatures; and (b) low observability. In low observability military aircraft, both these properties are important for use in components along the exhaust gas flowpaths of the aircraft engines. Exemplary ceramic matrix composite components are nozzle flapliners and nozzle seal liners.

Such components must, typically, be secured to support structure. Typical aerospace fasteners are metallic. U.S. pregrant publications 20050260033A1 and 20050260034A1 disclose exemplary fasteners and their applications. If such fasteners are used to secure the CMC components, exposed metal of the fasteners may compromise low observability properties.

SUMMARY OF THE INVENTION

Accordingly, one aspect of the invention involves a fastener having a metallic member and a nonmetallic cap member. The metallic member has a head and a shaft. The shaft has a first end at the head, a distal second end, and an externally threaded portion. The metallic member further has a projection extending from the head opposite the shaft. The cap member is mated to the head opposite the shaft and retained by the projection.

In various implementations, the shaft may further have a gripping feature adjacent to the second end. The gripping feature may comprise at least one of internal or external splines or facets. For example, the gripping feature may comprise a hexagonal-section compartment. An underside of the head and an underside portion of the cap may form a stepped frustoconical surface. The cap may comprise or consist essentially of a ceramic matrix composite. An internally threaded nut may be in threaded engagement with the shaft.

Such a fastener may be used to secure an engine exhaust panel to a support structure. The panel may have a first surface exposed to an exhaust flowpath of the engine. The head and cap may be flush or subflush in a bevel in the panel first surface. The nut may be engaged to the shaft to sandwich the panel and support structure between the head and nut.

Another aspect of the invention involves a method for manufacturing a fastener. A non-metallic cap member is mated to a projection from a head of a metallic member. The projection is unitarily formed as a single piece with the remaining portion of the head and a shaft of metallic member, the shaft opposite the projection. The projection is deformed to a deformed condition retaining the cap member. The deformation may comprise melting. The metallic member may be manufactured by a process including cutting an external thread on the shaft and forming a compartment in an end of the shaft opposite the projection.

Another aspect of the invention involves a fastener comprising a ceramic matrix composite cap, a metallic member having a head and a threaded shaft, and means securing the cap to the head. The fastener may include means for engaging the metallic member.

Another aspect of the invention involves a method for assembling an engine exhaust panel assembly using such a fastener. The fastener shaft is inserted through an aperture in a ceramic matrix composite panel and an aperture in a support structure. The shaft is engaged to an internally threaded nut. The nut is engaged with a tool. A feature of the shaft is engaged with the tool or with another tool. The nut and fastener are relatively rotated to tighten the nut to the fastener.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
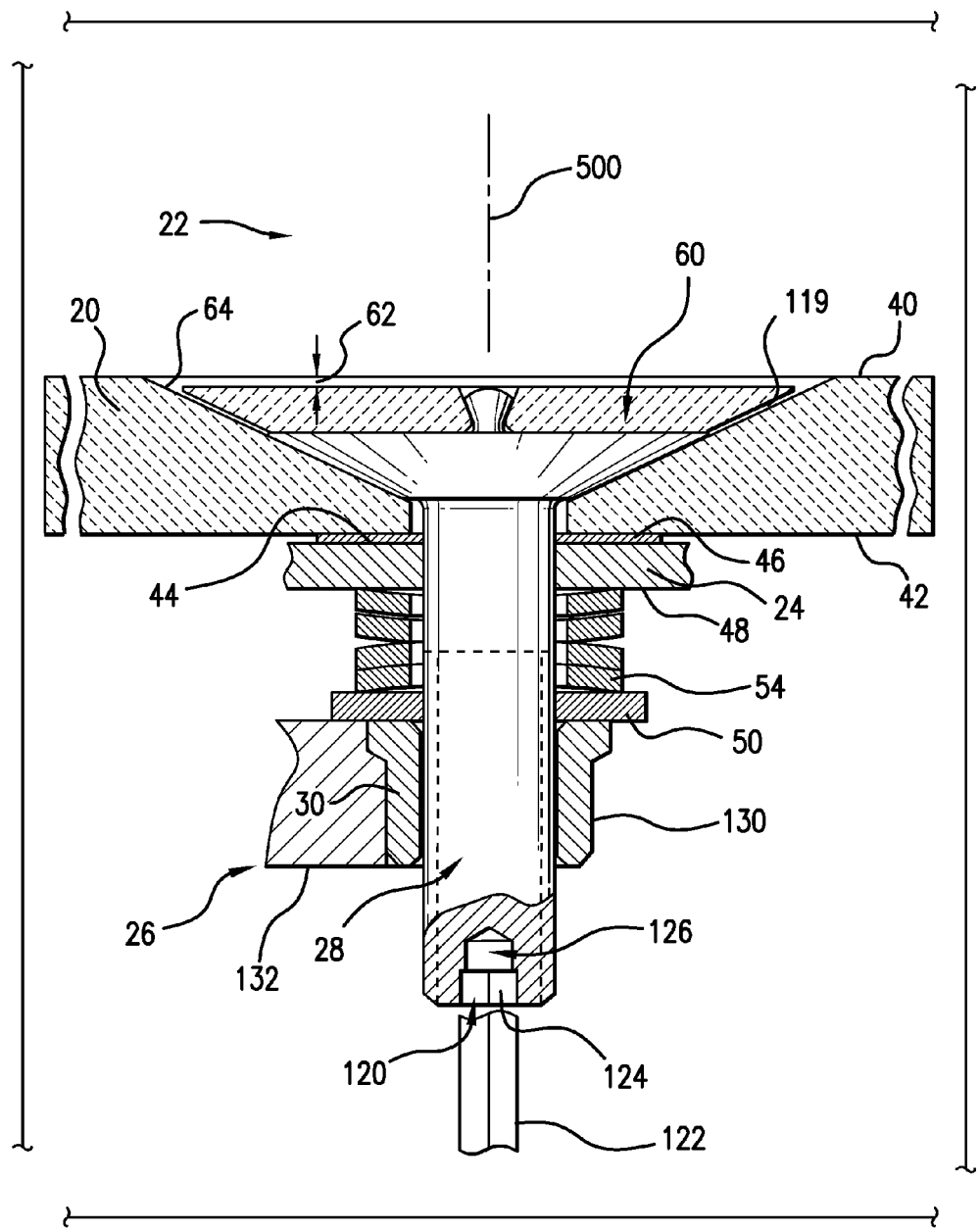
FIG. 1 is a sectional view of a fastener assembly mounting a CMC panel.

FIG. 1 shows a panel 20 along an exhaust flowpath 22 of a gas turbine engine 10. The panel 20 is mounted to a support structure 24 by means of a plurality of fastener assemblies 26. The exemplary fastener assemblies each comprise a stud 28 and a nut 30 having a common central longitudinal axis 500.

Each panel 20 has a first face 40 along the exhaust flowpath 22 and an opposite second face 42 engaging a first face 44 of the support structure 24. The engagement may be through a washer (e.g., metallic) 46 or other rigid or compliant intervening component. A second face 48 of the support structure 24 is engaged by the nut 30 (e.g., via a second washer 50 and a biasing compression coil spring 54. An exemplary panel thickness between the faces 40 and 42 is 5-20 mm.

The exemplary stud 28 has a head 60 countersunk flush or near flush (e.g., slightly sub-flush by an offset 62) to the panel first face 40. The panel countersink is formed by a frustoconical bevel surface 64.

To provide desired structural security of mounting, the threaded portion of the stud may advantageously be formed of an appropriate aerospace alloy (e.g., a nickel-based superalloy). However, a large exposed head surface of such alloy would potentially increase observability of the aircraft. For example, the exposed metal head would provide a non-negligible radar return in a tail-on view. To limit the observability impact of the fastener, advantageously a large portion of the exposed surface of the head may be formed of a material selected for this purpose.

Figure 2:
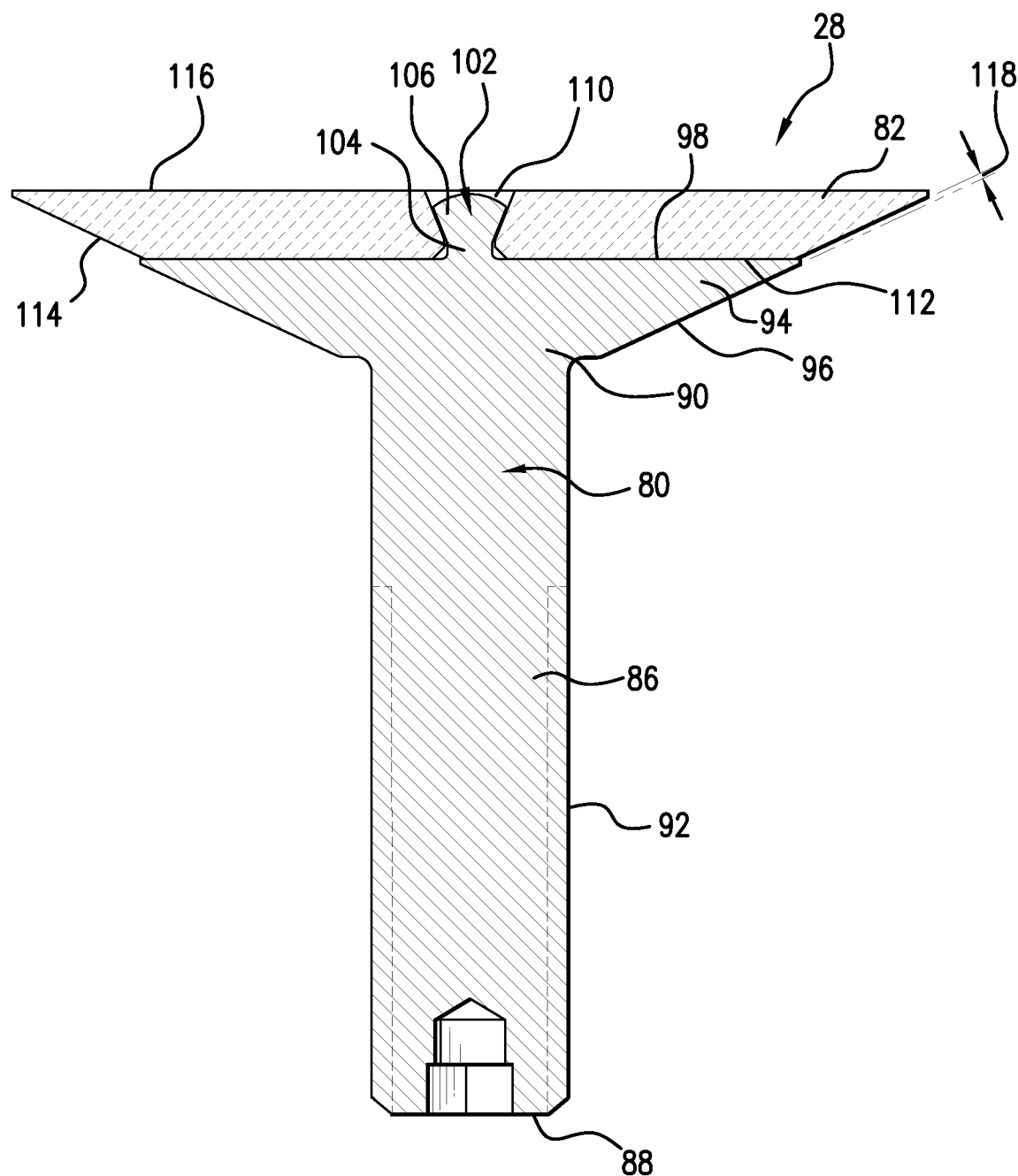
FIG. 2 is a sectional view of a stud of the assembly of FIG. 1.

FIG. 2 shows further details of the exemplary stud 28. The stud includes a metallic member 80 (e.g., of the nickel-based superalloy) and a non-metallic cap 82 (e.g., of CMC). The metallic member 80 comprises a shaft 86 having a distal end 88 and a proximal end 90. A shaft threaded portion 92 is located therebetween. At the proximal end 90, the shaft is unitarily formed with a head 94. The exemplary head 94 has an essentially frustoconical underside 96 and a flat outboard face 98 opposite the surface 96. A slightly protuberant projection 102 extends from the head opposite the shaft and has a relatively small diameter proximal portion 104 and a larger diameter distal portion 106.

The projection 102 is captured in a compartment 110 in the cap 82 to retain the cap to the head 94 so that the cap 82, head 94, and projection 102 essentially form the stud head 60. Thus, the projection and compartment form means of the metallic member 80 and cap 82 for securing the cap to the head of the metallic member. The cap has a radially inboard face 112 engaged to the head outboard face 98. A frustoconical surface 114 extends from the face 98 and combines with the head frustoconical underside 96 to form a slightly stepped frustoconical stud head underside contacting the bevel surface 64. The cap has an outboard face 116 opposite the face 112. The cap outboard face 116 forms a great majority of the surface area of the stud exposed to the exhaust flowpath 22 to provide relatively low observability and thermally protect the metallic member. The frustoconical surface 114 is recessed from the frustoconical surface 96 by an offset 118. This offsetting allows for compressive engagement between the surface 96 and the surface 64 while not subjecting the surface 114 to stressing contact with the surface 64. Accordingly, a gap 119 (FIG. 1) is of slightly smaller dimension than the recess/offset 118 and, subject to manufacturing tolerances, advantageously close to zero.

Figure 7:
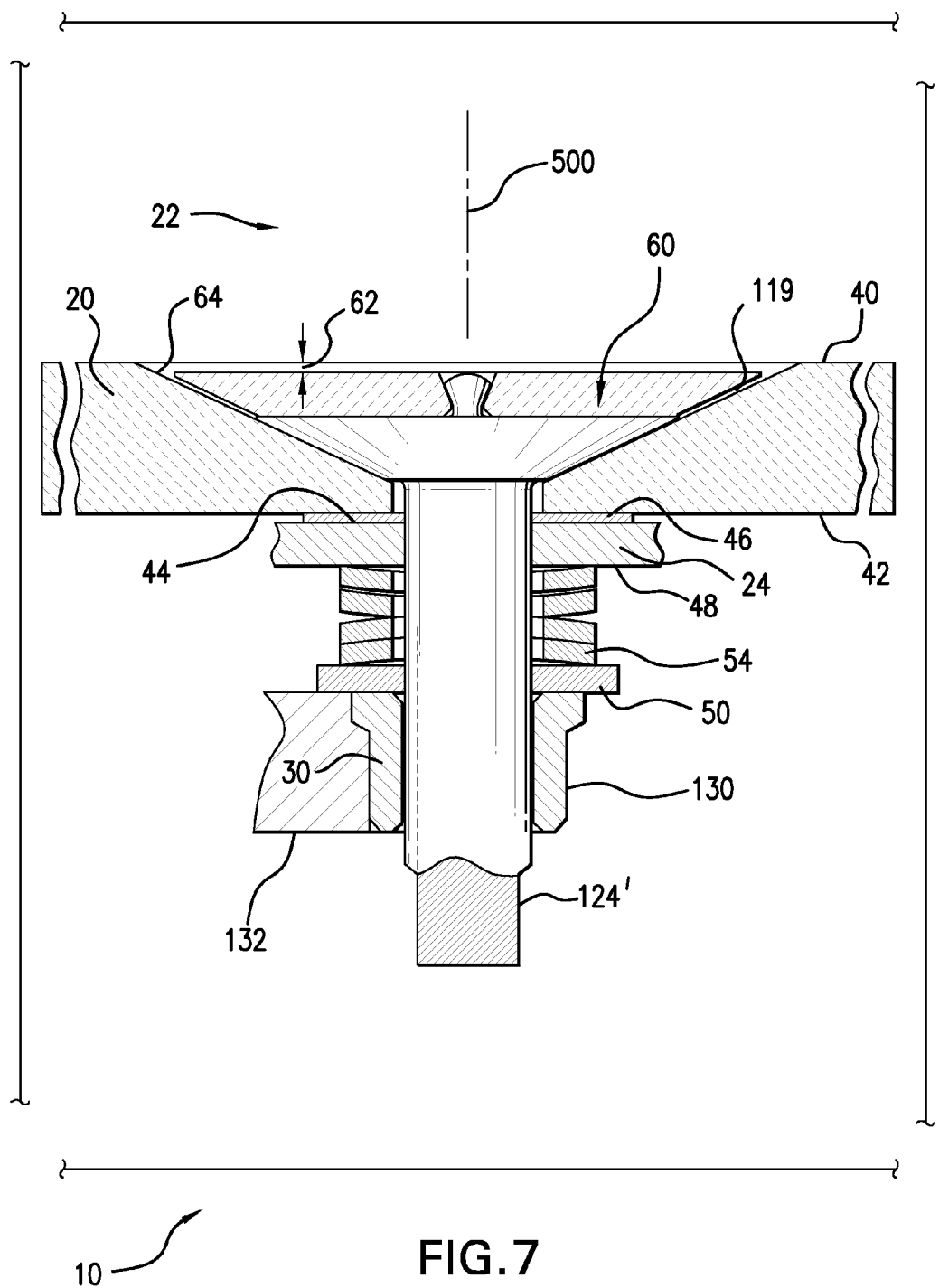
FIG. 7 is a sectional view of an alternate fastener assembly mounting a CMC panel.

Near the distal end 88, the shaft 86 includes an engagement feature 120 (means for engaging the metallic shaft 86) permitting the shaft to be engaged by a tool 122 to prevent rotation of the stud 28 during installation of the nut 30 (or otherwise provide a desired relative rotation of the shaft 86 relative to the nut 30 to tighten the nut onto the shaft). The exemplary engagement feature comprises an internal feature such as facets 124 providing a hexagonal section distal portion of a counterbored compartment 126. An alternative engagement feature might comprise internal splines or external splines or facets (schematically shown as 124' in FIG. 7). Similarly, the nut 30 has an engagement feature (e.g., external hexagonal faceting 130 for wrench 132 engagement).

Figure 3:
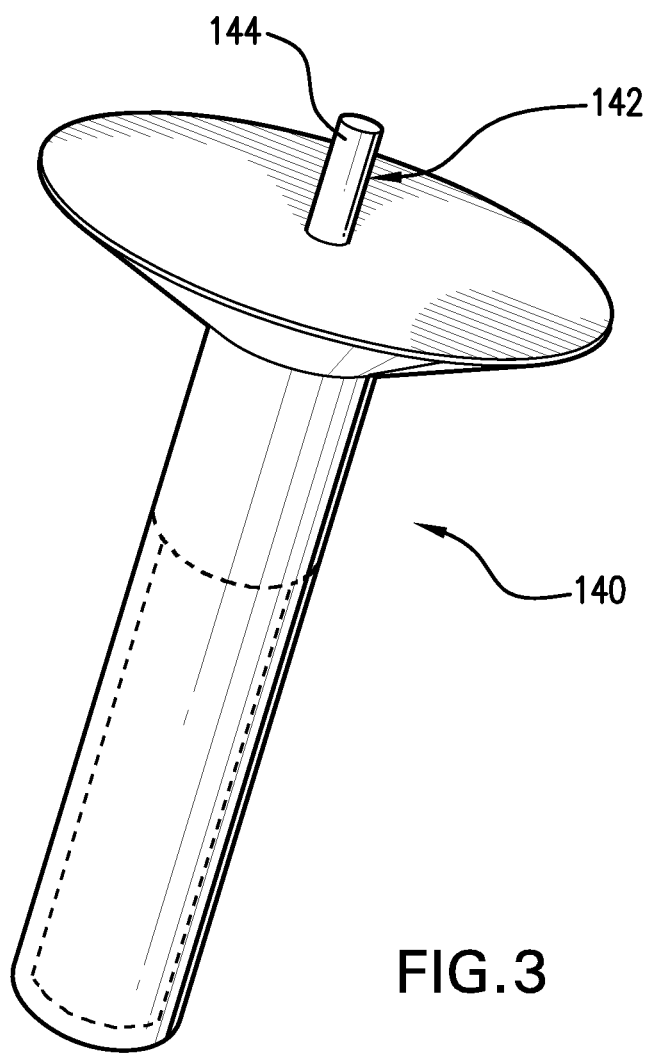
FIG. 3 is a view of a precursor of a metallic portion of the stud of FIG. 2.

In an exemplary method of manufacture, a precursor 140 (FIG. 3) of the metallic member 80 may be formed (e.g., by conventional screw machining techniques). The precursor 140 has all the portions of the metallic member except that a precursor 142 of the projection 102 extends from the head outboard face 98. The precursor 142 may be formed as a shaft of relatively smaller diameter than the shaft 86 and greater length than the ultimate projection 102. As is discussed below, during subsequent assembly, a distal end portion 144 of the precursor 142 is melted to form the protuberant distal portion 106 of the projection.

Figure 4:
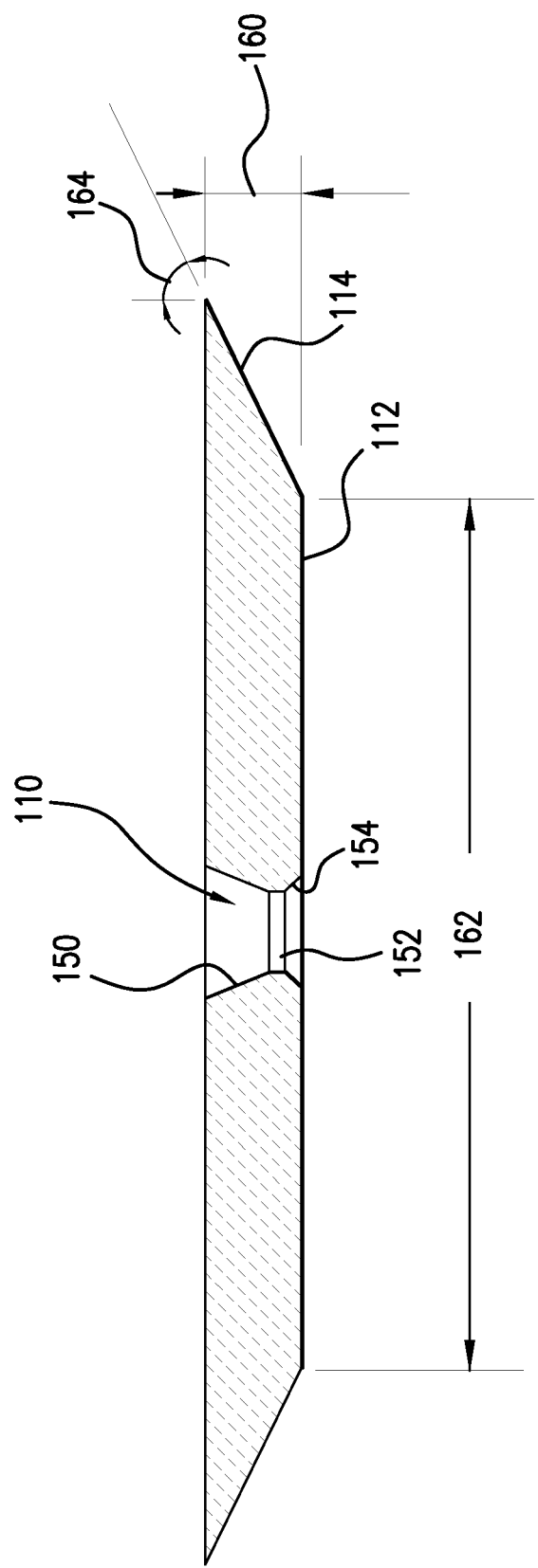
FIG. 4 is a sectional view of a cap of the stud of FIG. 2.
Figure 5:
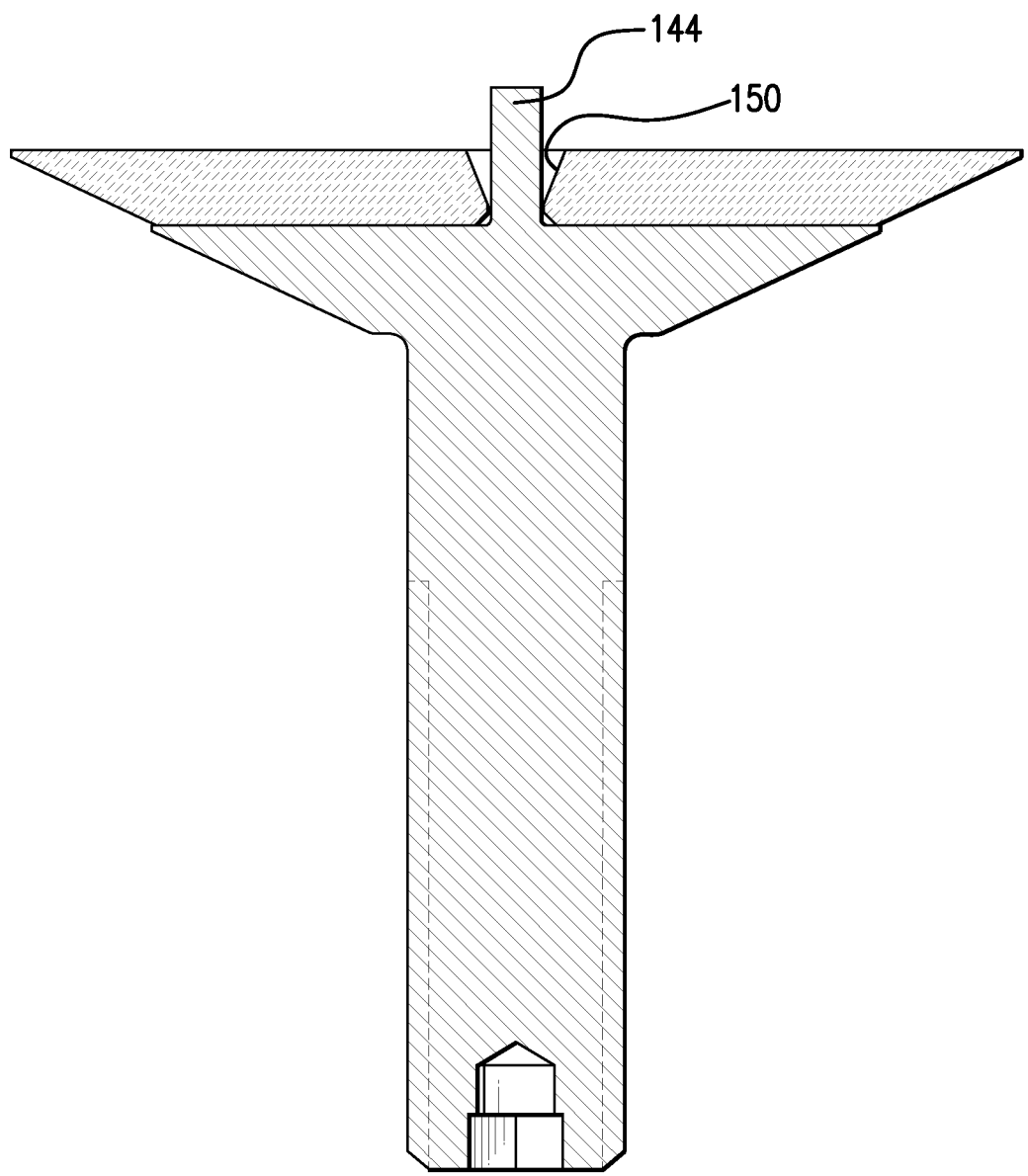
FIG. 5 is an assembled view of the precursor and cap in an initial stage of manufacture.
Figure 6:
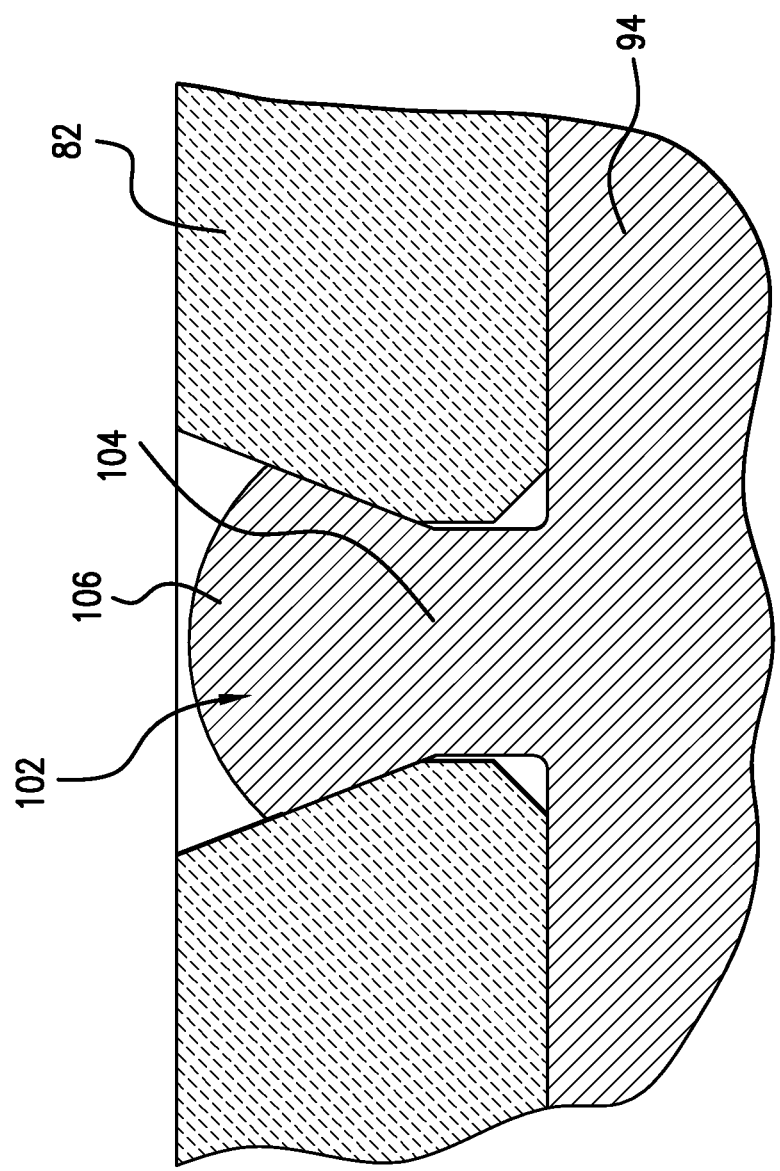
FIG. 6 is a partial sectional view of a head of the stud of FIG. 2.

The cap 82 may be made by cutting (e.g., water jet cutting) from a CMC sheet. The cap compartment 110 (FIG. 4) is formed by an outboard bevel 150 extending from relatively narrow diameter inboard neck portion 152 and inboard bevel 154. The inboard neck portion 152 is dimensioned to closely accommodate the projection proximal portion 104. The exemplary cap 82 has a thickness 160 (e.g., 2-4 mm). An exemplary diameter 162 of the cap inboard face 112 is 10-30 mm. An exemplary half angle 164 of the frustoconical surface 114 is 50-70°. To assemble the fastener, the cap 82 is placed over the projection precursor 142 (FIG. 5) so that the distal portion 144 of the precursor lies within or protrudes from the outboard bevel 150. The distal portion 144 is then melted or otherwise deformed (FIG. 6) to expand its diameter to form the projection 102 and backlock the cap 82 to the head 94. The exemplary melting forms the projection 102 flush or slightly sub-flush to the outboard surface 116.

One or more embodiments of the present invention have been described. Nevertheless, it will be understood that various modifications may be made without departing from the spirit and scope of the invention. For example, the fastener may be provided by reengineering the head of any of a number of known or yet-developed fastener configurations. Accordingly, other embodiments are within the scope of the following claims.

What is claimed is:
1. A fastener comprising:
  a metallic member having a unitarily formed, single piece, combination of:
    a head;
    a shaft having:
      a first end at the head;
      a distal second end; and
      an externally threaded portion; and
    projection extending from the head opposite the shaft; and
  a nonmetallic cap member mated to the head opposite the shaft and retained by a deformation of the projection.
2. The fastener of claim 1 wherein:
  the projection is protuberant.
3. The fastener of claim 1 wherein:
  the projection has a proximal portion and a distal portion of larger diameter than the proximal portion.
4. The fastener of claim 1 wherein:
  the shaft further comprises a gripping feature adjacent the second end.
5. The fastener of claim 4 wherein:
  the gripping feature comprises at least one of:
  internal facets, internal splines, external facets, and external splines.
6. The fastener of claim 4 wherein:
  the gripping feature comprises a hexagonal-section compartment.
7. The fastener of claim 1 wherein:
  an underside of the head and an underside portion of the cap form a stepped frustoconical surface.
8. The fastener of claim 1 wherein:
  the cap comprises or consists essentially of a ceramic matrix composite.
9. The fastener of claim 1 further comprising:
  an internally threaded nut in threaded engagement with the shaft.

10. An engine exhaust panel assembly comprising:
a panel having a first surface exposed to an exhaust flowpath of the engine;
a support structure supporting the panel; and
a fastener according to claim 1 securing the panel to the support structure.

11. The assembly of claim 10 wherein:
the head and cap are flush or sub-flush in a bevel of the panel.

12. The assembly of claim 10 wherein:
a nut is engaged to the shaft.

13. A fastener comprising:
a ceramic matrix composite cap;
a metallic member having a head and a threaded shaft; and
means for securing the cap to the head.

14. The apparatus of claim 13 further comprising:
means for engaging the metallic member.

15. The apparatus of claim 14 wherein:
the means for engaging the metallic member comprises an internal compartment in a distal end of the shaft.

16. The apparatus of claim 13 wherein:
an underside of the head and an underside portion of the cap form a stepped frustoconical surface.

17. A fastener comprising:
a ceramic matrix composite cap;
a metallic member having a head and a threaded shaft; and
a projection of the metallic member unitarily formed as a single piece with the head and the threaded shaft and securing the cap to the head.

18. The fastener of claim 17 wherein:
the projection is protuberant.

19. The fastener of claim 17 wherein:
the projection has a proximal portion and a distal portion of larger diameter than the proximal portion.

* * * * *